United States Patent [19]

Callan

[11] 3,900,999

[45] Aug. 26, 1975

[54] RUBBER COMPOUNDING
[75] Inventor: John E. Callan, Trenton, N.J.
[73] Assignee: Cities Service Oil Company, Tulsa, Okla.
[22] Filed: Oct. 29, 1971
[21] Appl. No.: 193,990

[52] U.S. Cl. .................. 52/744; 156/244; 156/308; 156/344; 161/36; 161/239; 161/242; 161/243; 161/253; 161/255; 264/171; 264/176 R; 156/309; 156/71
[51] Int. Cl. ...... E04f 13/08; B29b 1/04; B32b 3/14
[58] Field of Search ............ 156/304, 306, 71, 244, 156/338; 161/252, 243, 242, 253, 36, 202, 217, 221, 239, 255; 264/211, 236, 347, 216, 171, 176 R

[56] References Cited
UNITED STATES PATENTS

| | | | |
|---|---|---|---|
| 3,126,306 | 3/1964 | Sherman | 156/304 |
| 3,454,462 | 7/1969 | Hawley | 156/306 |
| 3,522,831 | 8/1970 | Torti et al. | 161/252 |
| 3,617,419 | 11/1971 | Fischer et al. | 161/252 |
| 3,651,176 | 3/1972 | Usamoto et al. | 161/252 |
| 3,653,423 | 4/1972 | Paddock | 161/252 |
| 3,669,828 | 6/1972 | Usamoto et al. | 161/252 |
| 3,674,735 | 7/1972 | Callan | 260/33.6 A |
| 3,704,196 | 11/1972 | Callan | 156/306 |
| 3,708,379 | 1/1973 | Flint | 161/253 |

Primary Examiner—William J. Van Balen
Assistant Examiner—William R. Dixon, Jr.
Attorney, Agent, or Firm—Elton F. Gunn

[57] ABSTRACT

A vulcanizing agent for rubber is incorporated into a polymer which is substantially noncrosslinkable by the agent but which is fusible with rubber upon milling. The resulting polymeric mixture and a vulcanizable rubber are formed into strips which are joined together along the lengths thereof to form an elongated, two-component tape wherein the rubber vulcanizing agent is carried in the nonreactive polymer. Sections of the tape can be milled to produce a vulcanizable compound by blending the polymeric component with the rubber component, thus obviating any need for separate addition of a rubber vulcanizing agent. The tape can be wound on a reel and stored until the need for blending arises. Premature reaction of the vulcanizing agent with the rubber is prevented since it is bound within the noncrosslinkable polymer. In one highly useful application, the two-component tape is fed continuously to an extruder wherein blending of the components is effected, and whereby the resulting blend is continuously extruded as a self-curing sealant tape which is simultaneously applied to a structural joint requiring a seal.

17 Claims, No Drawings

RUBBER COMPOUNDING

BACKGROUND OF THE INVENTION

The present invention pertains to the compounding of rubber. More particularly this invention pertains to compounds of vulcanizable rubber wherein a vulcanizing agent for the rubber is contained in a polymeric carrier which is substantially inert to cross-linking effects of the agent, and whereupon milling the compound the rubber and the polymeric carrier become blended, and the vulcanizing agent thus becomes distributed throughout the rubber for effecting the cure thereof.

It is known to mix rubber with compounding ingredients such as fillers and oils, and sometimes also one or more curatives such as activators or accelerators, in order to produce rubber masterbatches. A central theme in the masterbatching concept is that the product can be shipped to a purchaser in a remote location who can in turn use the compound with resort to little or no further addition and mixing of ingredients. If, however, a vulcanizing agent is added to the masterbatch at the time of original compounding, "shelf-life" comes into play, since the rubber begins to vulcanize during storage, and even though the rate of cure of the compound may be relatively slow at storage conditions, the state of cure can develop to an extent which renders the compound unprocessable if the storage life is too prolonged. In other words, the compound can no longer be processed by milling or extrusion, or otherwise further compounded or shaped into articles which can be subsequently vulcanized to set the shape of the articles and provide a desired combination of rubber stress-strain properties.

SUMMARY OF THE INVENTION

It is therefore an object of this invention to provide a rubber compound comprising a rubber in combination with a vulcanizing agent therefor, yet wherein cross-linking of the rubber by the agent is avoided until such time as vulcanization is desired.

Another object of this invention is to provide a rubber masterbatch in combination with a vulcanizing agent for the rubber, said masterbatch being stable during storage whereby curing reaction between the rubber and the vulcanizing agent is avoided until the masterbatch has been processed.

Yet another object of this invention is to provide a processable compound of vulcanizable rubber which comprises a vulcanizing agent for the rubber, said compound being stable during storage and whereby further addition of curatives to the compound at the time of processing is obviated.

Even another object of this invention is to provide a method of combining a vulcanizable rubber with a vulcanizing agent therefor whereby premature cross-linking of the rubber by the agent is avoided.

Still another object of this invention is to provide a rubber tape that is stable during storage and which can be processed to provide a curable rubber compound without having to add a rubber vulcanizing agent to the rubber prior to processing of the tape.

Another object of the present invention is to provide a method for producing a self-vulcanizing elastomeric sealant tape, at the site where the tape is applied to a structural joint to be sealed, without having to add a rubber vulcanizing agent at the site.

In accordance with the present invention, a two-component polymeric type is produced which comprises as a first component a polymer having a rubber vulcanizing agent incorporated therein and which is substantially noncrosslinkable by the vulcanizing agent. The second component of the polymeric tape is a rubber curable by the vulcanizing agent contained by the polymer of the second component. Each component of the tape is in the form of elongated pieces joined together along the lengths thereof. The polymer of the first component is also characterized by an ability to fuse and blend with the rubber of the second component upon milling of the two-component tape.

Explained further, a rubber vulcanizing agent is first incorporated into a relatively inert polymer such as a polyisobutylene rubber, an ethylene-propylene rubber or an ethylene-vinyl acetate copolymer. This mixture is then formed into an elongated piece, such as a strip, bar, or tube, by well known methods such as extrusion, and is the first component of the aforementioned two-component polymer tape. As the second component, a rubber vulcanizable by the vulcanizing agent contained in the first component is formed into an elongated piece such as strip, bar, or tube. The two component pieces are then joined lengthwise, most conveniently by pressing them together, and depending upon tack or adhesion to effect the union.

It will thus be apparent that the ingredients of the two components of the polymer tape are not blended together at the time the tape is produced, but remain substantially unmixed until such time as it is desirable to disperse the vulcanizing agent within the rubber, i.e. prior to such time the ingredients of the two components remain substantially separated, being in contact with one another only at the interfacial connection between the two elongated component pieces.

To distribute the vulcanizing agent within the rubber, the two-component tape need only be milled by conventional means, e.g., a roll mill, a Banbury mill, or a screw-type extruder. Where preferred the two-component tape can be employed to continuously produce a self-curing elastomeric sealant tape by feeding the two-component tape from a reel into a screw-type extruder and thereby continuously blending the ingredients of the components and extruding a self-curing sealant tape having a preferred configuration and cross-sectional area. To particular advantage, the two-component tape can be blended and extruded to produce self-vulcanizing tapes at the site where they are to be applied to joints being sealed by using, for instance, a portable extruder as described in copending applications Ser. No. 94,810 filed Dec. 3, 1970, and Ser. No. 193,991, filed Oct. 29, 1971, now both U.S. Pat. No. 3,758,001, both of which are assigned to the same assignee as this application.

DETAILED DESCRIPTION OF THE INVENTION

The type of rubber vulcanizing agent incorporated into the polymer of the first component of the tapes of this invention is subject to the discretionary choice of the compounder, and depends among other things upon the type of rubber to be vulcanized, the rate of cure desired, and the physical properties sought in the vulcanizate. The amount of vulcanizing agent incorporated into the polymer of the first component is also subject to considerable variation, and depends at least in part on the type of agent selected and the state of cure desired. Where preferred, two or more vulcanizing agents can be employed in combination.

As previously indicated, the polymer of the first component of the tape serves as a carrier for the vulcanizing agent for the rubber of the second component. Accordingly, the agent is "packaged" for convenient shipping and storage with the rubber to be vulcanized, yet essentially out of contact therewith, and obviating any need to later weigh up and add the agent when it is to be mixed with the rubber. Therefore, the polymeric carrier of the vulcanizing agent should be inert thereto or at least substantially noncrosslinkable thereby in order to prevent detrimental premature reaction and depletion of the vulcanizing agent prior to the need therefor. In addition, the polymeric constituent of the first component of the tape should be compatible with the rubber of the second component, and should also be fusible with the rubber during milling of the tape in order to achieve thorough blending of the polymer and the rubber and, hence, to accomplish uniform distribution of the vulcanizing agent throughout the rubber prior to initiating vulcanization.

Suitable polymers for use in the first component as a carrier of the vulcanizing agent include polyisobutylene rubbers, ethylene-propylene copolymer rubbers, ethylene-vinyl acetate copolymers, and mixtures of these.

Suitable rubbers for use as the second component of the tape include butyl rubbers, EPDM rubbers, polysulfide rubbers, polyurethane rubbers, silicone rubbers, thermoplastic acrylic rubbers, and compatible blends thereof.

The mass proportion of polymer in the first component of the tape to rubber of the second component is variable and in the larger sense depends upon the degree to which dilution of the rubber by the polymer can be tolerated, and in the lesser sense upon the amount of polymeric carrier required to achieve a workable, handlable mixture with the vulcanizing agent for forming and uniting an elongated piece of the mixture with the elongated piece of rubber. The concentration of the vulcanizing agent in the polymeric carrier, though subject to variation, should not be so great as to prevent effective isolation of the agent from the rubber prior to milling of the tape. The first component of the tape can, for instance, contain vulcanizing agent in amounts up to 20 parts by weight per 100 parts by weight of the polymer without experiencing detrimental premature reaction, but depending upon the particular vulcanizing agent employed, higher or lower concentrations may be indicated. It will also be appreciated that the cross-sectional area of the first component piece of the tape should not be so small as to bring a large percentage of the vulcanizing agent into contact with the rubber of the second component at the joint between the two lest the rubber be prematurely vulcanized to an undesirable extent at the vicinity of the interface.

When preferable and practical, additional curing agents for the rubber, e.g., an accelerator, an activator, etc., can be incorporated into the first or second component of the tape. Any curing agents including the rubber vulcanizing which are incorporated in the polymeric carrier of the first component are intended, of course, for the rubber of the second component. In addition rubber compounding ingredients can also be incorporated in the polymeric carrier of the first component, examples of which include process or extender oils, plasticizers, and inert or reinforcing fillers. Compounding ingredients contained in the first component can be included for imparting desirable handing and processing characteristics to the polymeric carrier, but at least a portion of any one or all these ingredients can also be intended for the rubber of the second component, being made available thereto when the two-component tape is milled for the purpose of blending.

The type of vulcanizable rubber employed in the second component of the tape is not critical in the present invention. The choice of type is mainly dependent upon the intended use of the rubber once it has been vulcanized. Blends of one or more compatible rubbers can be employed when preferred. The type or types of rubber chosen will, of course, influence the type and amount of curatives which are selected for incorporation into the polymeric carrier of the first component.

The rubber of the second component can also contain compounding ingredients such as oils, process aids and fillers as were previously mentioned as incorporative in the polymeric carrier of the first component. Choice of type and amounts of such ingredients are subject to broad variation depending upon the type of rubber and its intended use. The term "oil" or "process oil" as used herein is intended to mean a rubber process aid, extended, plasticizer, softener, tackifier or lubricant oil and includes aromatic, mapthenic and paraffinic petroleum derivatives, also polybutenes, and mixtures of such oils. Reinforcing and/or inert fillers which can be utilized include carbon black, silica, talc, calcium silicate, calcium carbonate, diatomaceous earth, mica, clays, and mixtures thereof.

In highly useful embodiments of the invention, e.g. for use in the production of sealant tapes, the second component of the two-component tape can be a rubber masterbatch comprising a vulcanizable rubber which contains a process oil and a rubber filler such as carbon black or calcium carbonate, and the first component can comprise a polymeric carrier which contains one or more vulcanizing agents for the rubber, a rubber cure accelerator, one or more process oils; and, if preferred, a filler.

The term "vulcanizable rubber" as used herein does not mean that the rubber is essentially unvulcanized. For instance, the rubber of the second component can be partially prevulcanized in order to increase the creep or flow resistance of the rubber, but can still be substantially vulcanizable by means of curing agents which are added to the rubber subsequently. Partial prevulcanization of the rubber prior to fabrication of a two-component tape of this invention is particularly helpful when the rubber is butyl rubber. One method of partially vulcanizing butyl rubber, especially when used in elastomeric sealant tapes, is described in U.S. Pat. No. 3,674,735 assigned to the same assignee as this application.

It is thus possible to produce many different varieties of the two-component tapes of the present invention, depending upon the intended application of the rubber when vulcanized, and also upon the choice of the particular compounder as to the type of rubber, polymeric carrier, curatives and compounding ingredients which he prefers to employ. Nonetheless, certain particularly advantageous embodiments of the present invention will become immediately apparent to the skilled compounder from the present disclosure, and still other embodiments can be arrived at through the skill of the compounder by resorting to a few simple experiments while using this disclosure as a guide.

As will be appreciated, mixing of the ingredients of both the first and the second components of the tape of this invention can be accomplished by well known technqiues, e.g. using a Banbury or roll mill or a screw-type extruder, while following whatever mixing techniques are indicated for the particular recipe involved.

The elongated pieces of the components which are joined along the lengths thereof for forming the two-component tapes can be produced in a variety of ways. For instance, the component compounds can be sheeted out and cut into strips which are then pressed together. More advantageously, the component compounds can be continuously extruded to produce elongated pieces. Where preferred, one piece can be formed with a U- or V-shaped groove along the length thereof, whereas the other fits into this groove. As an alternative, one component piece can be shaped as a rod, and the other component piece wrapped around it. Adherence of the joined component pieces to each other can usually be achieved through tack, but suitable adhesives can be employed if necessary. Of course, the proportion of ingredients in the two components should remain constant along the length of the tape. This can be achieved by thorough blending of the ingredients in each component compound, followed by forming of the compounds into elongated pieces having a uniform cross-section along the length thereof. Accordingly, when the assembled tape is continuously fed to a mill for blending and production of a vulcanizable mixture, variation in the composition of the milled compound is avoided. After formation, the two-component tape can be talced and wound on a reel or coiled in a box until ready for use.

When milling the two-component tape to achieve homogeneous blending of the ingredients, it is not necessary to apply external heat if miscibility of the rubber and the polymeric carrier material is good and the viscosity of the two is sufficiently low. In other cases the supplying of heat will be necessary, and is advantageous in almost all cases for achieving homogeneous blending in a minimum length of time. It will nonetheless be understood that scorch and degradation of the polymers should be avoided by judicious selection of time-temperature conditions during milling.

Prior to vulcanization, the blend produced by milling the two-component tape can be provided with the desired shape of the finished rubber article by any suitable means, e.g., by molding sheets or slabs under pressure, or by extrusion. When the desired rubber articles can be formed by continuous extrusion, the two-component tape can be fed continuously into a screw-type extruder, milled and blended therein using externally applied heat if necessary, and continuously discharged as a vulcanizable article of use in the form of a strip, tube, or sealant tape.

The term "sealant tape" as used herein is intended to mean an elongated strip of elastomeric sealant having a length, width, thickness, and shape suitable for application to, and sealing of, a structural joint requiring a seal. The term "elastomeric sealant" or "sealant composition" as used herein refers to pliant, weather-sealing compounds wherein rubber is the base, and which have a solid yet plastic or putty-like consistency so that the sealant can be pressed into the crevice of a joint, but which will maintain its shape and position after application. At the time of installing the sealant, it should be viscous enough to resist creep or sag, but should nonetheless be sufficiently plastic for insertion into the crevice. Therefore, the rubber of the sealant should be unvulcanized or only partially vulcanized at the time of installing the tape. Plasticity of the sealant can also be adjusted by inclusion of a thermoplastic resin such as polyethylene or ethylene-vinyl acetate, also by means of plasticizers, extender oils and tackifiers, and with the commonly employed inert and/or reinforcing fillers as have previously been mentioned. Where preferred, a rubber vulcanizing agent can also be incorporated with the sealant composition for vulcanization in situ after installation in a structural joint either by the deliberate application of heat or by allowing the sealant to self-vulcanize by incidental heating which occurs after placement of the tape. Through vulcanization, the tape becomes stiffer, stronger, and more resistant to creep and sag. However, tapes which have been extensively prevulcanized are too stiff to install.

It will thus be understood that vulcanizable sealant tapes which are ready for immediate use are easily provided by feeding a two-component tape of this invention into a screw-type extruder, milling the tape therein and thus blending the ingredients, and followed by discharge of the blend from the extruder as a sealant tape. To particular advantage the extruder can be portable or readily movable, thereby permitting direct application of the sealant to a structural joint at the site of construction. For instance, the two-component tape can be shipped to the location of the extruder, and there will be no further need to mix ingredients prior to extrusion of the sealing tape. Accordingly, a vulcanizable tape can be conveniently extruded and applied to joints in architectural or automotive construction units wherein the joint is masonry-to-masonry, metal-to-metal, metal-to-glass, glass-to-glass, masonry-to-metal, and the like.

As previously indicated, the two-component tapes of this invention can be processed by means of the portable extruder-type sealant applicator described in co-pending applications Ser. No. 94,810 filed Dec. 3, 1970, and Ser. No. 193,991 filed Oct. 29, 1971. The extruder described therein is a handheld device which permits easy placement and movement of the extrusion orifice over the structural joint being sealed. Opposite the discharge end of the extruder barrel, a port is provided for introducing the sealant composition which is extruded as a tape, and the device can also be equipped with a reel upon which the two-component tape may be wound. Means are also provided for supplying controlled amounts of heat to the extruder barrel. The extrusion screw is driven by an electric motor having an on-off switch mounted on a hand-grip, thus permitting close control over the extrusion operation.

EXAMPLES

The object of the experiments described herein was to produce two-component tapes which could be milled, blended and extruded to provide self-vulcanizing sealant tapes.

As the first component for the tapes, a masterbatch was produced by homogeneously blending the following ingredients:

Masterbatch-A

|  | Parts by Weight |
|---|---|
| Vistanex L-80 (a) | 100 |
| Indopol H-100 (b) | 100 |
| Indopol H-1900(c) | 20 |
| GMF (d) | 20 |
| Vulklor (e) | 10 |
| MBTS (f) | 20 |

Masterbatch-A-continued

| | |
|---|---|
| Microwhite 95 (g) | 20 |

(a) Polyisobutylene rubber; Enjay Chemical Co.
(b) Polybutene; Amoco Chemical Co.
(c) Polybutene; Amoco Chemical Co.
(d) p-Quinonedioxime, vulcanizer, Uniroyal Chemical Co.
(e) Tetrachloroquinone, vulcanizer, Uniroyal Chemical Co.
(f) 2,2-Benzothiazyl disulfide, accelerator
(g) Calcium Carbonate, Sylacauga Calcium Product Co.

As the rubber component for the tapes, the following ingredients were homogeneously blended to provide a partially cross-linked butyl rubber:

Masterbatch-B

| | Parts by Weight |
|---|---|
| Bucar 5000 NS (a) | 100 |
| Tufflo 6056 (b) | 30 |
| Celite HSC (c) | 30 |
| SP-1055 (d) | 1 |

(a) Butyl Rubber, ML-3 at 260°F. of 55; Cities Service Co.
(b) Paraffinic Process Oil; Sinclair Refining Co.
(c) Diatomaceous Earth; John-Mansville Products
(d) Bromomethyl, alkylated, phenol-formaldehyde resin; Schenectady Chemicals, Inc.

In compounding Masterbatch-B, the resin was first thoroughly mixed with the diatomaceous earth, and all of the ingredients were then blended in a Banbury. The masterbatch was also heated to effect cross-linking and partial cure of the rubber. The Mooney viscosity (ML-3' at 260°F.) of the resulting masterbatch was 55.

As the second component for the tapes the partially cross-linked butyl rubber of Masterbatch-B was mixed the following ingredients to form a homogeneous blend:

Masterbatch-C

| | Parts by Weight |
|---|---|
| Masterbatch-B | 100 |
| Statex R-H (a) | 90 |
| Indopol H-100 | 70 |
| Tufflo 6056 | 30 |
| Stearic Acid | 2 |

(a) an HAF-HS carbon black (ASTM Designation N-347), Cities Cervice Company

Masterbatch-C was extruded to form five elongated pieces, each having a circular cross-section with a diameter of five sixteenths inch. Masterbatch A was also extruded into elongated pieces having circular cross-sections, but at four different diameters, so that when attached to the elongated pieces of Masterbatch-C, four different two-component tapes were produced wherein the weight proportion of the first component (curative masterbatch) to the second component (rubber masterbatch) were as follows:

| | Parts by Weight | |
|---|---|---|
| Tape | M'batch-A | M'batch-C |
| B | 12.25 | 292 |
| C | 18.375 | 292 |
| D | 24.50 | 292 |
| E | 30.625 | 292 |

These four two-component tapes, and an elongated piece of Masterbatch-C-designated Tape A, and which did not have a strip of Masterbatch-A attached-were fed into the previously described portable extruder. Each tape was milled therein, thus blending the ingredients at a temperature of about 250°F., and the resulting blends were then discharged from the extruder as sealant tapes having a three-eights inch square cross-section. Each of these sealant tapes was then subjected to the following tests, and the test values where were obtained are listed in Tables I and II.

Table I

| Tape | A | B | C | D | E |
|---|---|---|---|---|---|
| Parts Curative | — | 12.25 | 18.375 | 24.5 | 30.625 |
| | | Compression (lbs./cu.in.) | | | |
| Room Temperature | | | | | |
| 1 day | 94 | 98 | 89.5 | 100 | 84 |
| 1 week | 100 | 111 | 101 | 111 | 91 |
| 1 month | 103 | 126 | 115 | 103 | 106 |
| 3 months | 120 | 174 | 154 | 172 | 152 |
| Aged at 100°F. | | | | | |
| 1 day | 96 | 103 | 99.5 | 103 | 91 |
| 2 days | 98 | 115 | 109 | 105 | 97 |
| 1 week | 99 | 141 | 143 | 131 | 112 |
| 4 weeks | 100 | 173 | 180 | 173 | 139 |
| Shore Hardness | | | | | |
| 4 weeks at 100°F. | 8 | 14 | 18 | 17 | 20 |
| Aged at 158°F. | | | | | |
| 2 hours | 94 | 122 | 108 | 123 | 108 |
| 6 hours | 96 | 159 | 152 | 174 | 159 |
| 1 day | 114 | 193 | 199 | 208 | 190 |
| 1 week | 114 | 263 | 249 | 262 | 252 |
| Aged at 190°F. | | | | | |
| 1 hour | 98 | 165 | 179 | 168 | 170 |
| 2 hours | 96 | 164 | 179 | 187 | 161 |
| 5 hours | 99 | 186 | 195 | 175 | 194 |
| 1 day | 115 | 257 | 253 | 280 | 249 |

Table II

| Code | A | B | (B) | C | (C) | D | (D) | E | (E) |
|---|---|---|---|---|---|---|---|---|---|
| Parts Curative | — | 12.25 | | 18.375 | | 24.5 | | 30.625 | |
| | | | Yield (p.s.i.) | | | | | | |
| Room Temperature | | | | | | | | | |
| 1 day | 7.4c | 7.5c | | 6.5c | | 7.1c | | 6.6c | |
| 1 week | 8.8c | 8.4c | | 8.1c | | 8.9c | | 8.2c | |
| 1 month | 8.4c | 9.1a | | 8.3c | | 9.2a | | 10.7a | |
| 3 months | 9.3c | 12.3a | | 11.5a | | 12.3a | | 11.8a | |
| Aged at 100°F. | | | | | | | | | |
| 1 day | 8.1c | 8.0c | | 8.5c | | 7.4c | | 7.5c | |
| 2 days | 8.6c | 9.5c | | 9.1c | | 8.5c | | 8.6c | |
| 1 week | 8.9c | 16.3a | (134) | 23.0a | (119) | 23.5a | (117) | 16.3a | (162) |
| 4 weeks | 9.6a | 11.1a | | 10.2a | | 9.8a | | 11.1a | |
| Aged at 158°F. | | | | | | | | | |
| 2 hours | 8.5c | 9.6c | | 8.7c | | 8.9c | | 8.7c | |
| 16 hours | 7.7c | 12.8a | (200) | 14.3a | (164) | 16.0a | (152) | 15.1a | (137) |
| 1 day | 9.5c | 15.4a | (158) | 15.6a | (129) | 17.1a | (128) | 15.6a | (122) |
| 1 week | 12.9c | 21.3a | (79) | 20.6a | (85) | 17.2a | (90) | 19.0a | (85) |
| Aged at 190°F. | | | | | | | | | |
| 1 hour | 8.1c | 12.9a | (238) | 14.6a | (146) | 13.7a | (190) | 13.6a | (158) |
| 2 hours | 9.3c | 14.4a | (158) | 15.9a | (146) | 17.7a | (146) | 11.1a | (79) |
| 5 hours | 7.2c | 13.3a | (98) | 13.8a | (85) | 13.8a | (75) | 12.4a | (79) |

Table II-continued

| 1 day | 9.3c | 12.4a | (73) | 12.0a | (60) | 11.8a | (60) | 11.6a | (67) | a = adhesive failure.
c = cohesive failure.
Values in paranthesis represent % Elongation at Adhesive Failure.

COMPRESSION VALUE

Two specimens of sealant tape 3 inches long and three-eights inch square are placed parallel to each other 1 inch apart between two glass plates having dimensions of 3 inches by 3 inches by one-quarter inch. This assembly is compressed in an Instron Tester at a speed of 2 inches per minute until the distance between the plates is 0.200 inches. The pounds of pressure required to achieve this degree of compression is then converted to pounds per cubic inch based on the total volume of the tape specimens. Unless otherwise indicated, testing is carried out at 75°F. Repeatable accuracy of the test is about ± 10 percent.

YIELD VALUE

An assembly of tape and glass plates is made up and compressed as in the compression test. The glass plates are pulled apart by means of the Instron Tester at the rate of 1 inch per minute (75°F.) to failure of either the cohesive or adhesive bond of the sealant with the glass. Pounds of pull required to effect the separation is converted to pounds per square inch based upon the original average cross-sectional area of the tape specimens. A test value of 7.5 p.s.i. or higher is preferable.

For ease of installation, sealant tapes should have a compression value not in excess of about 200 p.c.i., and more preferably should be within the range of about 80–120 p.c.i. at the time of installation. However, if the tape should stiffen, as through self-vulcanization after installation, such is advantageous since the sealant is less likely to creep and sag out of place upon continued exposure to atmospheric temperatures which can run as high as 190°F. The occurance of such temperatures is not uncommon in structures exposed directly to sun, e.g. automobiles, buildings, and roadways, and most of which have joints which require sealing against the weather.

From Tables 1 and 2 it can be seen that vulcanizable sealant tapes produced in accordance with the present invention (Tapes B-E) were superior to the nonvulcanizable tape (Tape A). The vulcanizable tapes improved in compression and yield value as their exposure to curing conditions was increased. It should also be pointed out that Tape A was a standard, soft Original Equipment Manufacture's automobile windshield sealant tape compound, and with this view in mind the superior compression and yield properties of sealant tapes produced in accordance with the present invention can be further appreciated.

This invention has been described with reference to particular materials, proportions, conditions, apparatus, techniques, and so forth, but it will be understood that still other embodiments will become apparent which are within the spirit and scope of the invention defined in the appended claims:

Therefore, what is claimed is:

1. A two-component polymeric tape which comprises as a first component a polymer selected from the group consisting of polyisobutylenes, ethylene-propylene copolymers, ethylene-vinyl acetate copolymers and blends thereof, said polymer having a rubber vulcanizing agent incorporated therein and being substantially noncrosslinkable by said vulcanizing agent, and as a second component a rubber vulcanizable by said vulcanizing agent contained in said polymer, each of the components being in the form of substantially elongated pieces, the two component pieces being joined together along the lengths thereof, said polymer being fusible with said rubber upon milling said tape.

2. The rubber tape of claim 1 wherein the rubber of said second component is selected from the group consisting of butyl rubbers, EPDM rubbers, polysulfide rubbers, polyurethane rubbers, silicone rubbers, thermoplastic acrylic rubbers, and compatible blends thereof.

3. The rubber tape of claim 1 wherein said first component also contains a rubber compounding oil.

4. The rubber tape of claim 1 wherein said first component also contains a rubber cure accelerator.

5. The rubber tape of claim 1 wherein said first component also contains a rubber filler.

6. The rubber tape of claim 1 wherein said second component also contains a rubber filler.

7. The rubber tape of claim 1 wherein said second component also contains a rubber compounding oil.

8. The rubber tape of claim 1 wherein the polymer of said first component is a polyisobutylene rubber.

9. The rubber tape of claim 1 wherein the rubber of said second component is butyl rubber.

10. Method of producing a vulcanizable polymer composition which comprises milling a two-component tape as defined in Claim 1 and thus blending said components thereof.

11. Method of claim 10 wherein said tape is fed continuously into a screw-type extruder, said components are blended by the masticating action of the extruder screw, and the blend is continuously discharged from the extruder as a vulcanizable article of use.

12. The method of claim 11 wherein the blend is discharged from the extruder in the form of a tape.

13. In a process for sealing a structural joint by filling the joint with a rubber sealing tape which vulcanizes in situ upon exposure to the conditions of use, the method which comprises milling the two-component rubber tape defined in claim 1 and thus blending the first and second components of said rubber tape with each other, extruding the resulting blend as a sealant tape, and applying said sealant tape to the structural joint to be sealed.

14. The method as defined in claim 13 wherein external heat is supplied to said components during the blending thereof and the resulting blend is extruded as a heated sealant tape.

15. The method of claim 13 wherein said first and second rubber components are continuously blended while simultaneously extruding said sealant tape.

16. The method of claim 15 wherein the sealant tape is simultaneously extruded and applied to said structural joint.

17. The method of producing a two component tape which comprises:

a. incorporating a rubber vulcanizing agent into a polymer that is substantially noncrosslinkable by said agent, said polymer being selected from the group consisting of polyisobutylenes, ethylenepropylene copolymers, ethylene-vinyl acetate copolymers, and blends thereof, b. forming the mixture of step (a) into an elongated piece, and c. joining the elongated piece from step (b) to an elongated piece of vulcanizable rubber curable by said vulcanizing agent, the union of the pieces being along the lengths thereof.

* * * * *